No. 705,974. Patented July 29, 1902.
W. TAYLOR.
SHUNTING LEVER.
(Application filed Apr. 15, 1902.)

(No Model.) 2 Sheets—Sheet 1.

Witnesses:
Inventor
William Taylor
By James L. Norris
Atty

THE NORRIS PETERS CO., PHOTO-LITHO., WASHINGTON, D. C.

No. 705,974. Patented July 29, 1902.
W. TAYLOR.
SHUNTING LEVER.
(Application filed Apr. 15, 1902.)
(No Model.) 2 Sheets—Sheet 2.
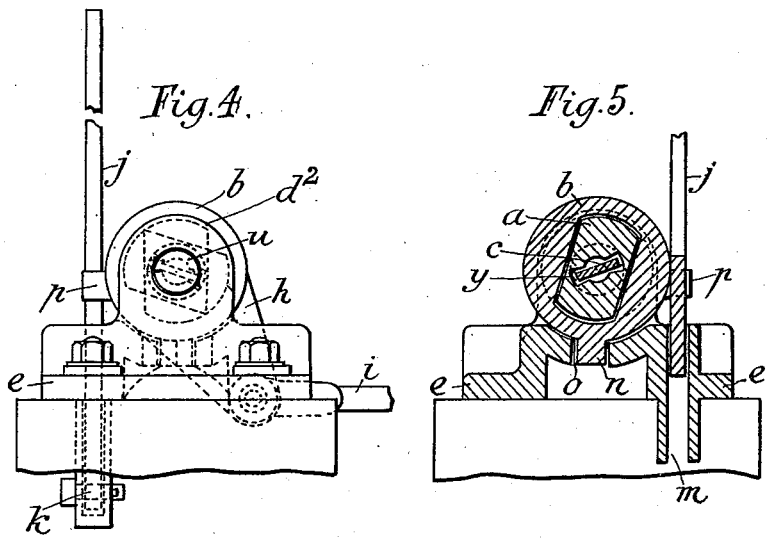
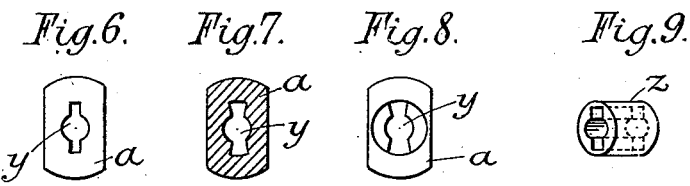
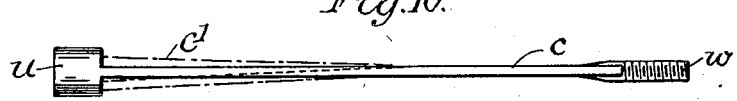
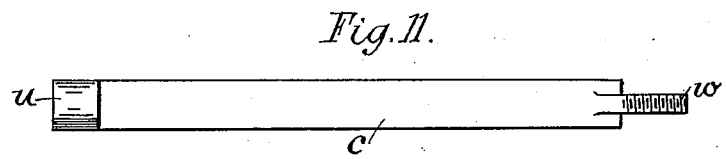
Witnesses:
Inventor
William Taylor
By
James L. Norris
Atty

UNITED STATES PATENT OFFICE.

WILLIAM TAYLOR, OF SANDIACRE, ENGLAND.

SHUNTING-LEVER.

SPECIFICATION forming part of Letters Patent No. 705,974, dated July 29, 1902.

Application filed April 16, 1902. Serial No. 102,994. (No model.)

*To all whom it may concern:*

Be it known that I, WILLIAM TAYLOR, a subject of the King of Great Britain and Ireland, residing at Sandiacre, in the county of Derby, England, have invented new and useful Improvements in Shunting-Levers, of which the following is a specification.

The present invention has reference to further improvements in the shunting lever or appliance described in my specification filed on the 23d day of December, 1901, Serial No. 87,019; and it has for its object to provide means whereby in case of need or of negligence (such as an engine being run backward through closed "points") it shall be possible for the engine to pass backward through the points safely without straining or otherwise injuring the said appliance and its connections. To this end I so construct the appliance that that part of it to which the point-rod is connected is free to yield without influencing the helical element or twist-cylinder, and so allow the closed points or "switches" to be opened sufficiently under pressure from the flanges of the wheels of the engine or train, but will resume its prior position and reclose the points or switches directly the rolling load has passed through them onto the rails beyond. According to a convenient arrangement instead of mounting the said helical element on a round spindle or axle fixed at both ends in bearings I now mount it on a flat axle-bar capable of slight torsion and fix this bar at one end only, and instead of forming the plain cylindrical part, to which the point-rod is connected, in one with the helical element I form it as a separate or independent piece and mount it loosely on the said flat axle-bar.

I will now describe my improvements fully with reference to the accompanying drawings, which illustrate one mode of carrying it out, and wherein the same letters of reference indicate like or corresponding parts to those in the said prior specification.

Figure 1:
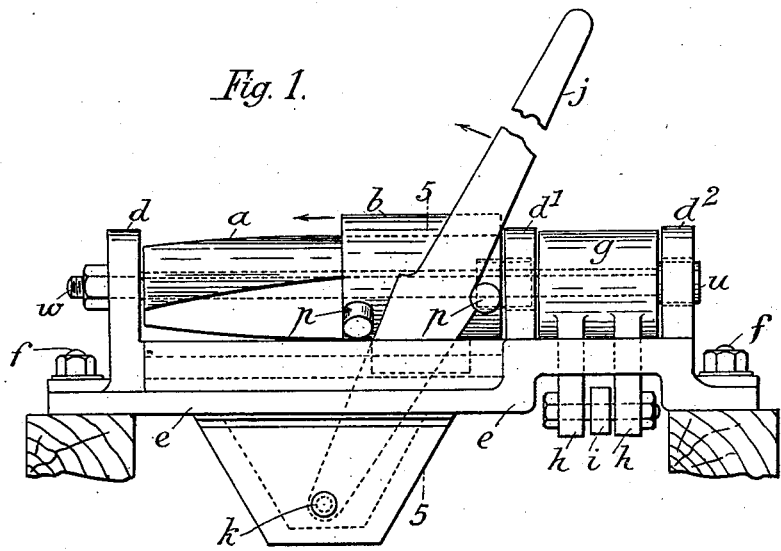
Figure 2:
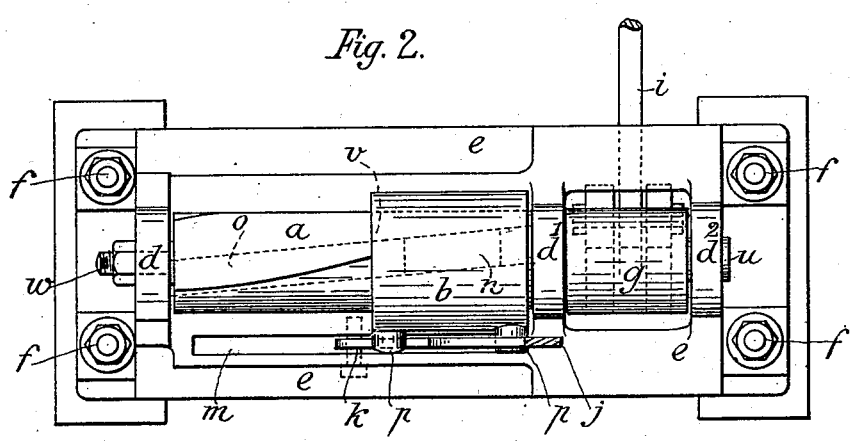
Figure 3:
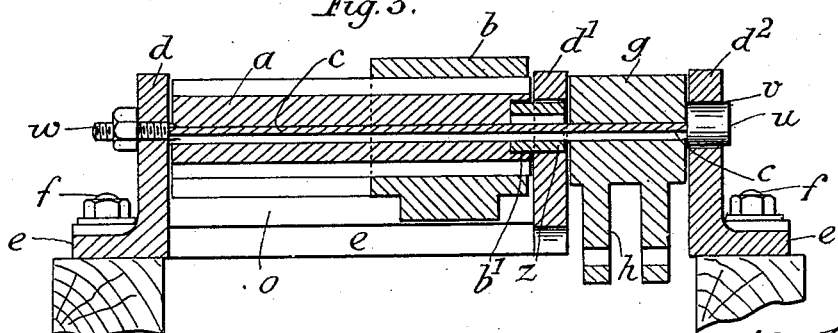

Figure 1 is a side elevation of a shunting-lever or switching appliance constructed in accordance with my present improvements. Fig. 2 is a plan of the same. Fig. 3 is a central longitudinal section. Fig. 4 is an end elevation looking toward the left of Fig. 1. Fig. 5 is a transverse section taken on the line 5 5 of Fig. 1 looking toward the right. Fig. 6 is an elevation of the left-hand end of the helical element; Fig. 7, a central transverse section thereof, and Fig. 8 an elevation of the right-hand end. Fig. 9 is a perspective view of a loose bush made use of in the appliance. Fig. 10 is a plan of the flat axle-bar, and Fig. 11 is an elevation of the same.

The bed-plate $e$ is provided with three upright bearings $d$ $d'$ $d^2$, in which is supported the axle-bar $c$ of the helical element or twist-cylinder $a$. This bar is of flat blade-like form (see Figs. 10 and 11) and is of steel or other suitable metal tempered so as to bear a torsional strain without injury. One end of it is formed into or provided with a cylindrical head $u$, which rests in a circular hole $v$ in the bearing $d^2$, and the other end is formed or provided with a screw-threaded pin $w$ or other means for enabling it to be held firmly at that end.

The helical element $a$ has a suitably-shaped slot—say a double-ended keyhole-slot $y$—extending throughout its length (see Figs. 3, 5, and 6) and is mounted loose on the axle-bar $c$. Said keyhole-slot gradually tapers from one end to the other and fits the axle-bar $c$ closely at the end to the left of Fig. 1, but is wide enough at the opposite end to afford the said bar a certain amount of lateral play.

$g$ is the plain cylindrical piece separate from the helical element and bearing lugs $h$, to which the point or switch rod $i$ is connected by a bolt. This piece takes the place of the plain cylindrical end of the helical element in the arrangement described in the prior specification, but has, like the helical element, a double-ended keyhole-slot $y$ through it and normally in alinement therewith. Said piece is mounted loose on the axle-bar $c$.

$b$ is the cored nut fitting the helical element and operated, as formerly, by the hand-lever $j$, pivoted at $k$ and working in the slot $m$ and engaging the stops $p$ on said nut. On pulling the hand-lever over in either direction the nut $b$ is forced to traverse the helical element $a$, and the rotary motion thereby imparted to the latter causes, through the intervention of the piece $g$ and axle-bar $c$, the movement of the point or switch rod $i$ in the desired direction, and thus effects the opening or closing of the points or switches.

$z$ is a separate loose cylindrical bush (shown detached in Fig. 9) resting partly in a hole in the bearing $d'$ and partly in a recess $b'$, formed for its reception in one end of the nut $b$. This bush, which serves as a support at this point for the axle-bar $c$, has also the keyhole-slot through it and is mounted loose on said bar.

The guide-slot $o$ in the bed-plate $e$ and the pin $n$ on the nut $b$ are now arranged slanting or at an angle to the axis of the helical element, as seen best in plan view, Fig. 2. This arrangement has been adopted as being likely to work more smoothly and with less wear and tear of the parts, as less twist need be put on the helical element.

The appliance is secured, by means of bolts $f$, to blocks or sleepers at the side of the rails.

The action is as follows: If an engine or train after having run through the points or switches and onto the part of the line beyond the same be run or running backward again over the same points or switches before they have been opened by the pointsman, the flanges of the wheels will insinuate themselves between the point-rail and the main rail, and so automatically open the points or switches sufficiently to permit of the passage of the wheels without damage to any of the parts concerned. The point-rod being connected to the separate or independent piece $g$ will yield, (be moved backward,) together with the said piece, when pressure is put on it by the opening movement of the point-rail, and this backward movement of the point-rod will, through the intervention of the said piece $g$, exert a torsional strain on the flat axle-bar $c$, which being held firmly at the end $w$ will twists lightly from that end toward the opposite end, and thus permit the required movement of the point-rod, and hence of the point-rails. After the engine has passed through the points or switches the latter are automatically closed again by the twisted axle-bar $c$ regaining its normal condition, the consequent movement of which is communicated, through the piece $g$ and lugs $h$, to the point or switch rod $i$.

The amount of twist of the axle-bar $c$ which it is possible to produce is limited only by the degree of taper given to the double keyhole-slot in the helical element.

The dotted lines in Fig. 10 illustrate the way the bar $c$ twists, the line $c'$ representing the bottom edge of such bar.

The appliance herein described is also applicable to the working of signals on railways.

Having now described my invention, what I claim is—

1. In a shunting-lever or switching appliance, the combination of a helical element provided with a slot, a cylindrical element or piece in alinement therewith and provided with a slot, and a flat axle-bar passing through the slot in both said elements, said flat axle-bar being capable of a slight torsion at one end only, thereby permitting the said cylindrical element to move independently of the helical element.

2. In a shunting-lever or switching appliance, the combination of a helical element provided with a tapering slot, a cylindrical element separate therefrom but in alinement therewith and provided with a tapering slot, and a flat axle-bar passing through said slots and held at one end only but capable of slight torsion at the other end, so permitting the cylindrical element to move without influencing the helical element.

3. In a shunting-lever or switching appliance, the combination of a helical element provided with a tapering double-ended keyhole-slot, a cored nut adapted to traverse the same and provided with means for preventing its rotation, a cylindrical element in alinement with said helical element but capable of a movement independent of the helical element, said cylindrical element provided with a tapering double-ended keyhole-slot, and a flat axle-bar passing through the slots and on which bar said elements are mounted, said bar being held firmly at one end only but capable of slight torsion at the other end, and means for operating said shunting-lever or switching appliance.

4. In a shunting-lever or switching appliance, the combination of a helical element provided with a double-ended tapering keyhole-slot extending axially therethrough, a traveling nut mounted thereon, a lever for operating said nut, a cylindrical element in alinement with said helical element and provided with a double-ended tapering keyhole-slot extending axially therethrough, a flat axle-bar passing loosely through said slots, a slotted bush mounted between the helical and the cylindrical elements and supported in an intermediate bearing, the ends of said axle-bar being mounted in end bearings in a manner to permit the cylindrical element to move independently of the helical element, by a slight torsion on one end of said axle-bar.

5. In a shunting-lever or switching appliance comprising a helical element provided with a tapering double-ended keyhole-slot extending axially therethrough, a cored nut adapted to traverse the same, a lever operating said nut, a cylindrical element in alinement with said helical element provided with a tapering double-ended keyhole-slot extending axially therethrough, a bush arranged between said elements and provided with a tapering double-ended keyhole-slot extending axially therethrough, the flat axle-bar, formed with a cylindrical head at one end and with a screw-threaded portion at the other end, adapted to pass through said elements and bush, and bearings to support the ends of said axle-bar.

In witness whereof I have hereunto signed my name in the presence of two subscribing witnesses.

WILLIAM TAYLOR.

Witnesses:
MARK SHAW,
ALFRED CLARKE.